July 23, 1968    L. H. MORIN    3,393,535
PLASTIC UNIVERSAL JOINTS
Filed July 27, 1966
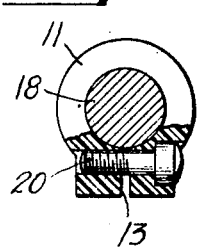
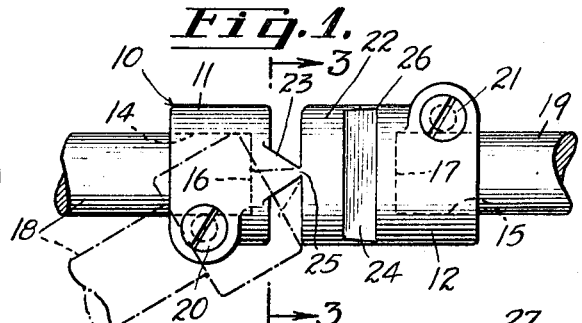
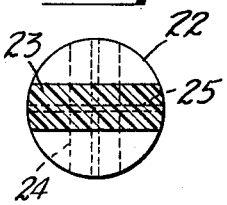
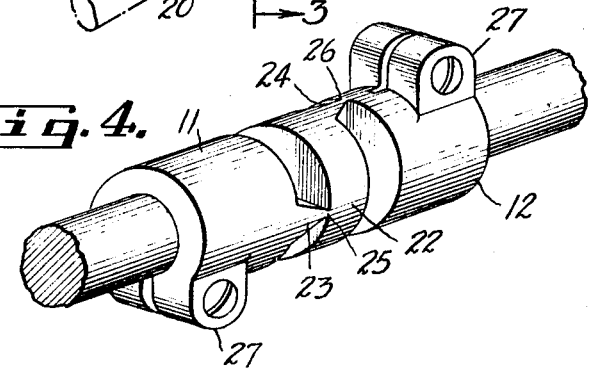
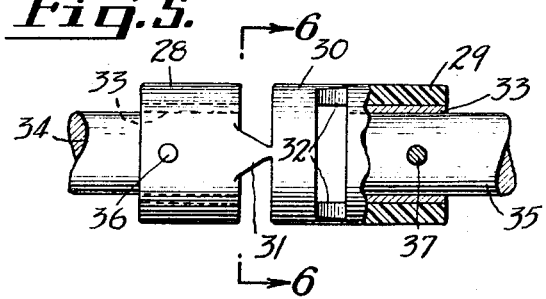
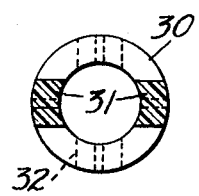
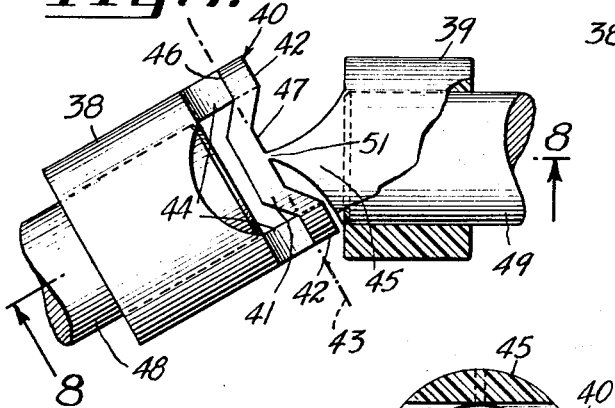
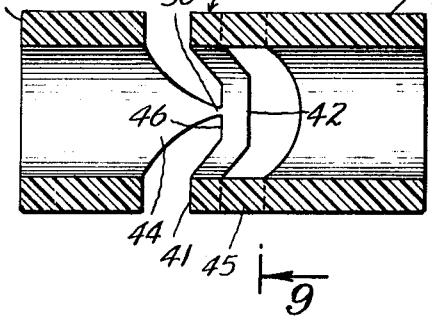
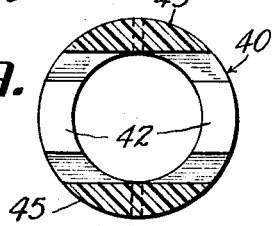
INVENTOR.
LOUIS H. MORIN
BY
Howard E. Thompson
ATTORNEY

United States Patent Office 3,393,535
Patented July 23, 1968

3,393,535
PLASTIC UNIVERSAL JOINTS
Louis H. Morin, Bronx, N.Y., assignor to Coats & Clark
Inc., New York, N.Y., a corporation of Delaware
Filed July 27, 1966, Ser. No. 568,331
2 Claims. (Cl. 64—11)

ABSTRACT OF THE DISCLOSURE

A moulded universal joint which comprises two end members joined to an intermediate ring member by rib-like members. The ribs have pivot edges which permit free flexing of the joint, the pivot edges being disposed on a common plane through the ring member.

---

This invention relates to the production of universal joints from molded plastic joint assemblages from materials having freely flexing properties such, for example, as polypropylene, wherein the joint comprises a pair of socket portions joined by a coupling element through the medium of rib-like members contracted to form freely flexing hinge or pivot edges. More particularly, the invention deals with a joint of the character described, wherein the ribs and pivot edges thereof are disposed at right angles to each other in the assemblage to provide free universal movement with respect to rods or the like coupled with the sockets of the joint.

Further, the invention deals with a joint of the character described, wherein the sockets can be reinforced by the use of metal liners. Still more particularly, the invention deals with a joint of the character described, wherein the freely flexing pivot edges are disposed in a single plane on the coupling element of the joint by utilizing offset portions in said coupling element.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a plan view of one form of joint which I employ, illustrating in dot-dash lines one of the flexed positions of the joint.

FIG. 2 is an end view of the structure shown in FIG. 1, with part of the construction broken away and in section.

FIG. 3 is a section on the line 3—3 of FIG. 1, omitting background showing.

FIG. 4 is a perspective view of a joint, generally similar to the joint of FIG. 1, showing a slight modification in the structure of the slit sockets employed.

FIG. 5 is a view, generally similar to FIG. 1, showing a modified form of joint, with part of the construction broken away to clearly illustrate the metallic liners employed.

FIG. 6 is a section on the line 6—6 of FIG. 5.

FIG. 7 is a view, generally similar to the showing in FIGS. 1 and 5, illustrating another form of joint construction, with one of the sockets of the joint in an angular position.

FIG. 8 is a section on the line 8—8 of FIG. 7 illustrating the sockets of the joint in common alinement and omitting the rods illustrated in FIG. 7; and FIG. 9 is a scetion on the line 9—9 of FIG. 8.

Throughout the several views, the universal joints will be formed from a suitable flexible plastic material having the property of enduring unlimited flexures without weakening or destruction to the joint and such material as polypropylene can be suitably used for this purpose.

Joints of the type and kind under consideration can be made of various sizes but the structure lends itself to the production of relatively small universal joints and, with the use of plastic materials such as indicated, joints of the type and kind under consideration can be produced at a very nominal cost and have the property of serving an extended or unlimited use without danger of fatigue or breakage.

As the structures of FIGS. 1 and 4 are substantially identical, except for a slight modification, the reference characters as applied to FIGS. 1 to 3, inclusive, will be applied to FIG. 4 to simplify the description. With these structures, the joint 10 comprises split sockets 11 and 12, the splits being arranged at 180° to each other, as will be apparent from the showing in FIG. 4 and one of the splits of the socket 11 is shown in section at 13 in FIG. 2 of the drawing. The sockets 11 and 12 include bores 14 and 15, having inner end or bottom walls 16 and 17 checking inward movement of the rods or the like 18 and 19, these rods being coupled with the sockets by screws 20 and 21, as will be apparent.

Between the sockets 11 and 12 is a round coupling disc or element 22 integrally joining the sockets 11 and 12 in ribs 23 and 24 arranged at right angles to each other. The rib 23 is contracted to join the disc 22 in a narrow freely flexing hinge or pivot edge 25; whereas, the rib 24 is contracted to join the socket 12 in an edge 26, similar to the edge 25.

From the foregoing universal joint structure, it will be apparent that the socket ends 11 and 12 are free to flex on the edges 25, 26, in the manner illustrated by the flexure of the socket 11 in dot-dash lines in FIG. 1 to provide, in the resulting joint, a full universal flexing coupling between the rods 18 and 19.

As hereinbefore stated, the structure of FIG. 4 is the same as that shown in FIG. 1, with the slight variation that the split portions of the sockets 11 and 12 project to a greater degree, as indicated at 27 in FIG. 4. Aside from this slight variation, the two structures are identical.

Considering the showing in FIGS. 5 and 6 of the drawing, here tubular sockets 28 and 29 are employed, these sockets being joined by a coupling ring or element 30 rather than the disc 22 and ribs 31 and 32 are employed, which are generally similar to the ribs 23 and 24, with the exception that these ribs are of a thickness corresponding to the thickness of the ring 30, as will clearly appear from a consideration of FIG. 6 of the drawing. With this structure, reinforcing metallic liners or bushings 33 are employed in the bore of the tubular sockets 28 and 29 and the rods or the like 34, 35 are fixed to the sockets by the use of key or coupling pins 36, 37. The liners 33 can be molded as inserts in the formation of the joint and are utilized primarily for secure anchorage of the rods 34, 35 with the sockets.

Turning now to the illustration in FIGS. 7 to 9, inclusive, in these figures, tubular sockets 38 and 39 are employed joined by a coupling ring or element 40, having offsets 41 and 42, the offsets being with respect to a common plane, indicated by the dot-dash line 43 in FIG. 7. With this construction, circumferentially extended ribs 44 and 45 are employed and, here, these ribs differ from the ribs 23, 24 and 31, 32 in that both ribs are contracted in the direction of the coupling ring or element 40. In other words, the ribs 44 are contracted to the plane surfaces 46 of the offsets 42; whereas, the ribs 45 are contracted to the plane surfaces 47 of the offsets 41. At 48 and 49 are shown rods or the like, which are cemented or otherwise fixed in the sockets 38 and 39 in the use of the joint. In these figures, the contracted freely flexing hinge or pivot edges of one of the ribs 44 is shown at 50, FIG. 8, and of one of the ribs 45 at 51 in FIG. 7. The pivot edges of the ribs 31, 32 are not specifically described, as they are generally similar to the pivot edges 25 and 26, shown in FIGS. 1 and 4 of the drawing.

For purposes of description, the rods or the like, which are coupled by the universal joint, can be said to be the joint coupled parts and the sockets of the joint can be defined as the end members secured to the parts to be universally coupled.

Having fully described my invention, what I claim as new and desire to secure by Letters Patent is:

1. A molded universal joint of freely flexible plastic material for universally coupling spaced parts, said joint comprising end members adapted to be secured to said parts, a coupling element joining said members through the medium of contracted ribs, the ribs joining the element with one member being at right angles to the ribs joining the element with the other member, said ribs having pivot edges providing free flexing of the joint at said pivot edges, said element being in the form of a ring and the pivot edges of said ribs being disposed upon opposed surfaces of said ring and said ring comprising pairs of oppositely offset portions defining on inner surfaces of the offsets one common plane through said ring, and said pivot edges being disposed on said one common plane.

2. A joint as defined in claim 1, wherein said members are in the form of tubular sockets.

References Cited

UNITED STATES PATENTS

| | | | |
|---|---|---|---|
| 2,643,528 | 6/1953 | Hammarbach | 64—15 |
| 2,860,495 | 11/1958 | Stark | 64—11 |
| 2,966,049 | 12/1960 | Ormond | 64—15 |
| 3,300,258 | 1/1967 | Kompanek et al. | 64—17 |
| 3,332,255 | 7/1967 | Seagreaves et al. | 64—11 |

FOREIGN PATENTS

| | | |
|---|---|---|
| 1,002,800 | 8/1965 | Great Britain. |
| 861,600 | 2/1961 | Great Britain. |

HALL C. COE, *Primary Examiner.*